United States Patent [19]
Ure

[11] Patent Number: 6,107,997
[45] Date of Patent: *Aug. 22, 2000

[54] TOUCH-SENSITIVE KEYBOARD/MOUSE AND COMPUTING DEVICE USING THE SAME

[76] Inventor: Michael J. Ure, 10518 Phil Pl., Cupertino, Calif. 95014

[*] Notice: This patent issued on a continued prosecution application filed under 37 CFR 1.53(d), and is subject to the twenty year patent term provisions of 35 U.S.C. 154(a)(2).

[21] Appl. No.: 08/672,093

[22] Filed: Jun. 27, 1996

[51] Int. Cl.$^7$ ........................................................ G09G 5/00
[52] U.S. Cl. .......................... 345/173; 345/156; 345/157; 345/174
[58] Field of Search ...................... 345/173, 156, 345/157, 159, 168, 169, 174; 341/20, 22

[56] References Cited

U.S. PATENT DOCUMENTS

| | | | |
|---|---|---|---|
| 4,042,777 | 8/1977 | Bequaetr et al. | 178/79 |
| 4,344,069 | 8/1982 | Prame | 341/26 |
| 4,891,777 | 1/1990 | Lapeyre | 364/706 |
| 5,194,862 | 3/1993 | Edwards | 341/20 |
| 5,457,476 | 10/1995 | Jenson | 345/146 |
| 5,635,958 | 6/1997 | Murai et al. | 345/168 |
| 5,730,602 | 3/1998 | Gieghart et al. | 434/155 |
| 5,739,814 | 4/1998 | Ohara et al. | 345/173 |
| 5,764,218 | 6/1998 | Della Bona et al. | 345/157 |
| 5,856,824 | 1/1999 | Shieh | 345/173 |
| 5,870,083 | 2/1999 | Shieh | 345/173 |
| 5,917,476 | 1/1999 | Czerniecki | 345/173 |

*Primary Examiner*—Edward Lefkowitz
*Assistant Examiner*—Davetta W. Goins

[57] ABSTRACT

The present invention, generally speakng, provides for a computing device in which the functions of both a keyboard and a mouse are realized compactly using a touch-sensitive pad. The function of a mouse may be realized in similar manner as known "track pads." The function of a keyboard may be realized using "chord keying," i.e., forming different touch patterns on the touch-sensitive pad corresponding to different characters. In one embodiment, the chord patterns are gready simplified as compared to known chord-keying arrangements. In particular, most characters may be input by forming a chord with the thumb and forefinger or thumb and middle finger only. A cross-hair pattern identifies nine separate touch areas, such that 36 unique two-touch (thumb and forefinger or middle finger) touch patterns may be formed. Additional sets of 36 characters each may be designated by specifying touch patterns to shift between characters sets. A computing device using the touch-sensitive keyboard/mouse may be made very small while still employing a familiar point-and-click mode of user interaction that further includes keying. Text may be input to the computing device quickly and easily. In another embodiment, a virtual keypad like that of a telephone is represented, with typically three letters assigned to each key. The familiar point-and-click operation of the computing device may be furthered by providing the computing device with two removable-media storage devices of a known type. In this way, the previous requirement of sub-notebook computers that the operating system, application programs and files all be small, may be loosened. In one embodiment, the computing device employs two color flat panel displays each mounted on different halves of a hinged housing. The housing may be closed, opened flat such that the two flat panel displays appear as one large display, or manipulated such that only one flat panel is visible and the device may be held comfortably in one hand.

54 Claims, 14 Drawing Sheets

| QZ rtn DEL<br>1<br>[ ] \ | ABC<br>2<br>{ } | DEF DEL<br>3<br>+ - = |
|---|---|---|
| GHI OPT<br>4<br>, . / | JKL<br>5<br>? ; : | MNO OPT<br>6<br>' " ^ |
| PRS CTL<br>7 | TUV<br>8 | WXY CTL<br>9 |
| shift KEYSET<br>*<br>! @ $ | Oper<br>0<br>% < > | space KEYSET<br>#<br>& ( ) |

TOUCH-SENSITIVE KEYBOARD/MOUSE AND COMPUTING DEVICE USING THE SAME

BACKGROUND OF THE INVENTION

1. Field of the Invention

The present invention relates to computing devices and to computer input devices.

2. State of the Art

Pen-based computers are known. As described in U.S. Pat. No. 5,457,476, incorporated herein by reference, a pen-based computer is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer system permit users to operate the computer as computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e., that the stylus is "inking" an image on the screen. With suitable recognition software, text and numeric information can also be entered into the pen-based computer system in a similar fashion.

Besides serving as a notepad, pen-based computers can provide a number of useful functions, such as provided in a personal organizer.

A problem with such pen-based computer systems has been the quick, accurate entry of text, especially passages of text longer than a name or phone number. To address this problem, some pen-based computer systems have been provided with optional compact keyboards. The problem with such keyboards, however, is that they defeat the original notion of the pen-based computer as being readily carried on one's person wherever one goes. If only the pen-based computer and not the keyboard is carried about, then the keyboard is unavailable for use the majority of the time. Planned, fixed usage of a keyboard, while marginally useful, does not effectively address the need for an improved method and device allowing for quick and easy input of text to a sub-notebook computing device.

An example of a particularly advantageous touch-sensitive computer input device is found in U.S. Pat. No. 5,194,862 issued Mar. 16, 1993 to Edwards (assigned to U.S. Philips Corporation), incorporated herein by reference. The patent discloses a touch sensor array built in a similar manner as a TFT active matrix liquid crystal display and which may be used as an overlay for the same. The touch sensor array offers comparable resolution as the liquid crystal display. U.S. Pat. No. 4,042,777 to Bequaert et al. (assigned to IBM) discloses a keyboard that uses chord keying. Mention is made of the possibility of realizing the key-board using touch keys rather than mechanical keys. The aforementioned patents, however, are silent regarding the quick and easy input of text to a sub-notebook computing device.

SUMMARY OF THE INVENTION

The present invention, generally speaking, provides for a a computer input device and computing device employing the same in which the functions of both a keyboard and a mouse are realized compactly using a touch-sensitive pad. The function of a mouse may be realized in similar manner as known "track pads." The function of a keyboard may be realized using "chord keying," i.e., forming different touch patterns on the touch-sensitive pad corresponding to different characters. In one embodiment, the chord patterns are greatly simplified as compared to known chord-keying arrangements. In particular, most characters may be input by forming a chord with the thumb and forefinger or thumb and middle finger only. A cross-hair pattern identifies nine separate touch areas, such that 36 unique two-touch (thumb and forefinger or middle finger) touch patterns may be formed. Additional sets of 36 characters each may be designated by specifying touch patterns to shift between characters sets. A computing device using the touch-sensitive keyboard/mouse may be made very small while still employing a familiar point-and-click mode of user interaction that further includes keying. Text may be input to the computing device quickly and easily. In another embodiment, a virtual keypad like that of a telephone is represented, with typically three letters assigned to each key. The familiar point-and-click operation of the computing device may be furthered by providing the computing device with two removable-media storage devices of a known type. In this way, the previous requirement of sub-notebook computers that the operating system, application programs and files all be small, may be loosened. In one embodiment, the computing device employs two color flat panel displays each mounted on different halves of a hinged housing. The housing may be closed, opened flat such that the two flat panel displays appear as one large display, or manipulated such that only one flat panel is visible, whereby the device may be held comfortably in one hand.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

The present invention is well suited for pointer based computer systems such as the pen-based, stylus-based and mouse driven systems that are currently popular.

Figure 1:
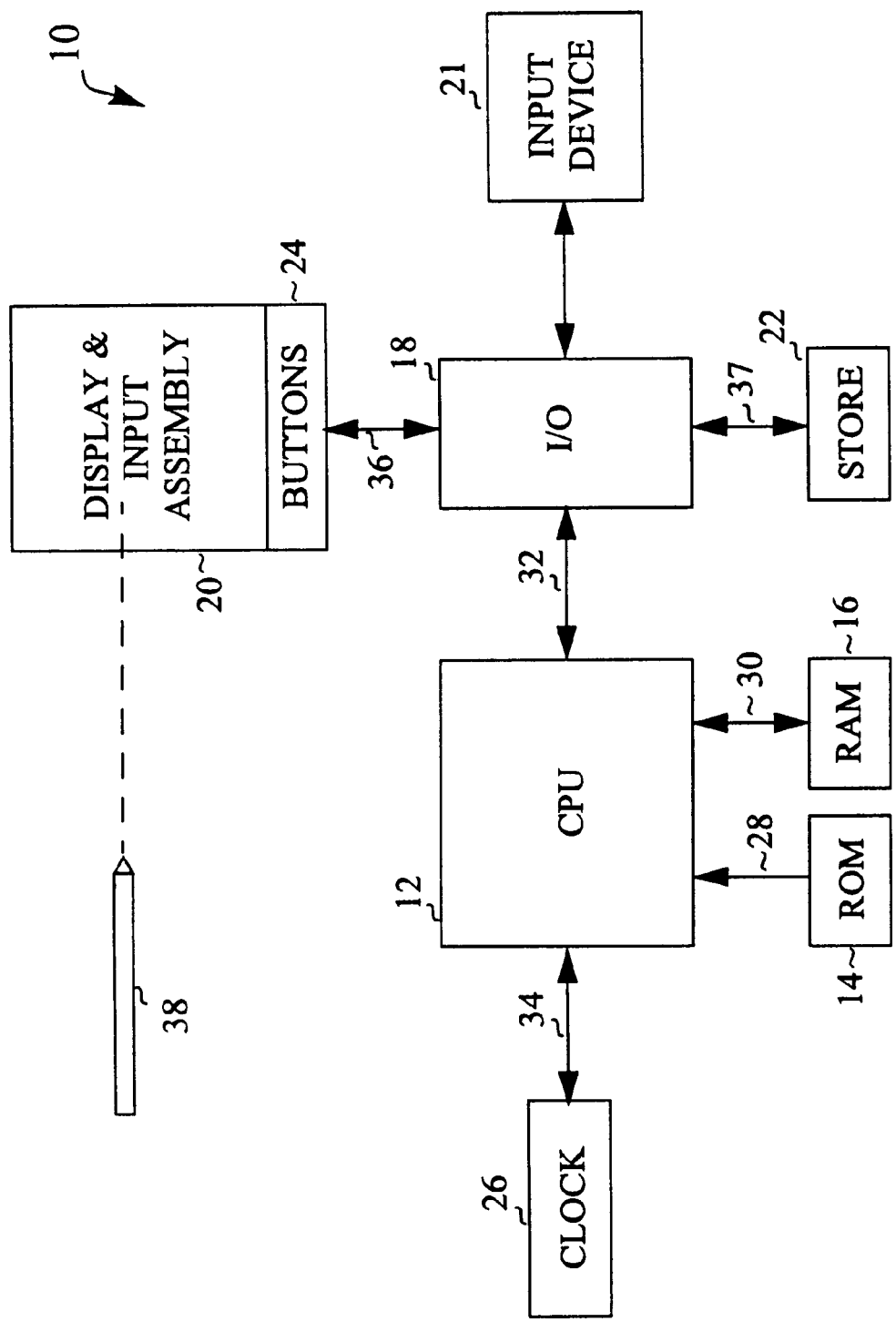
FIG. 1 is a block diagram of a computer system in accordance with one embodiment of the present invention.

As shown in FIG. 1, a computer system 10 in accordance with one embodiment of the present invention includes a central processing unit (CPU) 12, read only memory (ROM) 14, random access memory (RAM) 16, input/output (I/O) circuitry 18, and a display assembly 20. The computer system 10 may be "pen-capable," meaning that a stylus or pen may be used for inputting information into the computer system if desired, but that other means of input are also provided. The pen-capable computer system 10 may also optionally include a mass storage unit 22 such as a disk drive unit or nonvolatile memory such as flash memory, a keypad 24, and a clock 26.

The CPU 12 is preferably a commercially available, single chip microprocessor. CPU 12 is coupled to ROM 14 by a unidirectional data bus 28. ROM 14 may contain the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, input device 21 and input buttons 24.

Clock 26 preferably compresses a real-time clock to provide real-time information to the system 10. Clock 26 is coupled to CPU 12 by a bus 34.

Display assembly 20 of pen-capable computer system 10 is both an input and a output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers.

The input device of display assembly 20 is preferably a thin, clear membrane which covers the LCD display and which is sensitive to the position of a stylus 38 on its surface. With such a structure, the display assembly 20 can serve as an input "tablet." These position sensitive membranes are also readily available on the commercial market. Combination display assemblies such as display assembly 20 which include both the LCD and the input membrane are commercially available from such vendors as Scriptel Corporation of Columbus, Ohio.

The buttons 24 may comprise "soft buttons," i.e, images generated at convenient locations on the screen 42, each "button" being activated by touching the stylus to the screen over the image of the button. The buttons 24 may include a number of dedicated function buttons 52 and a pair of scroll buttons 54A and 54B, as well as a toolbox button 50.

Some type of mass storage 22 is generally considered desirable. Mass storage 22 can be coupled to I/O circuitry 18 by a bi-directional data bus 37. However, the mass storage 22 can be eliminated by providing a sufficient amount of RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, nonvolatile memory such as flash memory, battery backed RAM, PC-data cards, or the like.

In operation, information is input into the pen-based computer system 10 by "writing" on the screen of display assembly 20 with a stylus 38. Information concerning the location of the stylus 38 on the screen of the display assembly 20 is input into the CPU 12 via data bus 36 and 1(0 circuitry 18. Typically, this information comprises the Cartesian (i.e., X and Y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 10 to produce appropriate images on its screen.

Figure 2:
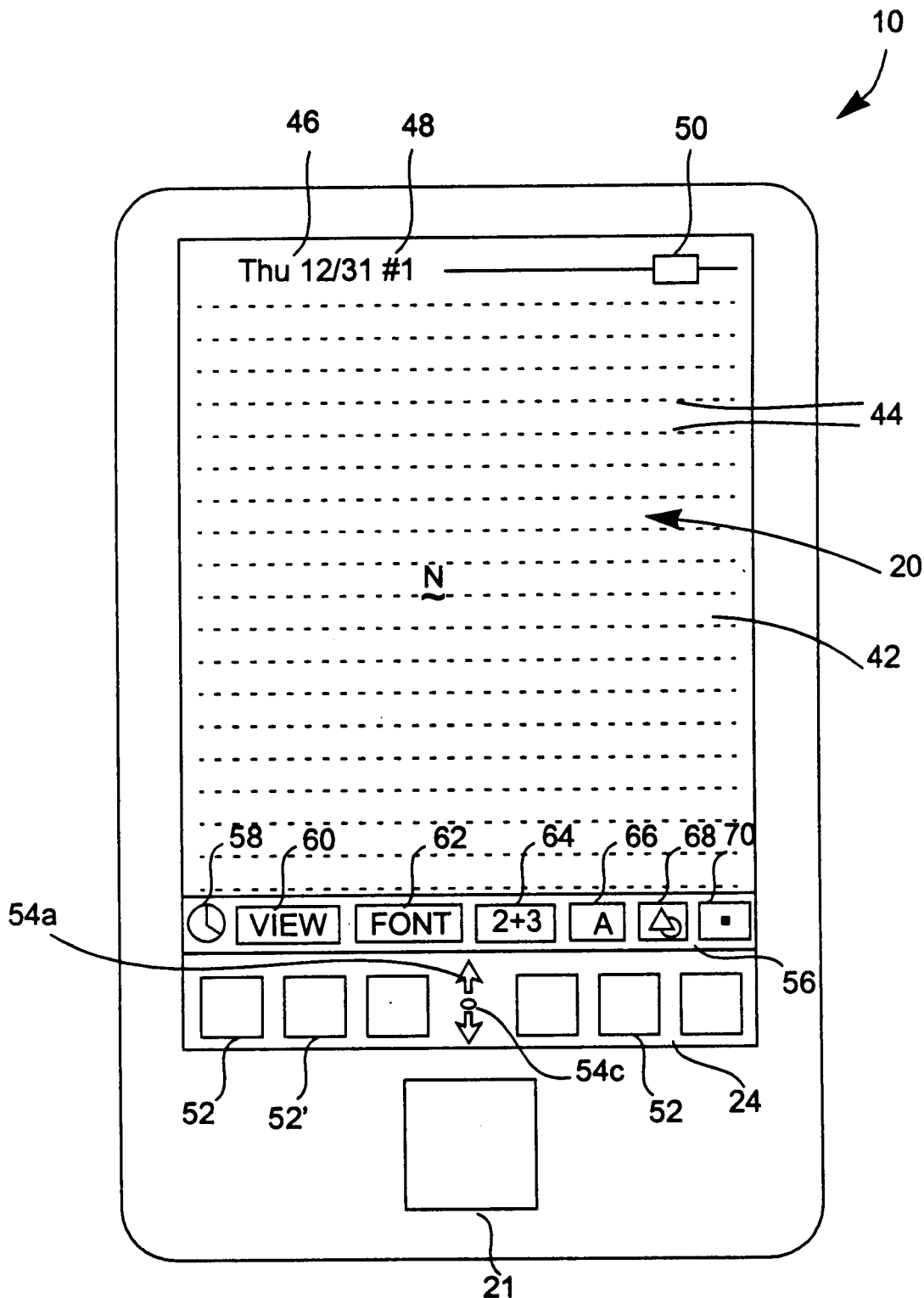
FIG. 2 is a top plan view of the screen, case and touch-sensitive input device of the computer system of FIG. 1.

In FIG. 2, the pen-based computer system 10 is shown housed within a generally rectangular enclosure 40. The CPU 12, ROM 14, RAM I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user are the buttons 24.

Upon power-up, pen based computer system 10 displays on screen 42 an initial note area N including a header bar B and a number of guidelines 44. The header bar B preferably includes the date of creation 46 of the note N, a note number 48, and a "toolbox" button 50. The optional guidelines 44 aid a user in entering text, graphics, and data into the pen-based computer system 10.

The screen illustrated in FIG. 2 is referred to as the "notepad," and is an application program running under the operating system of the pen-capable computer system 10. The notepad may be a "base" application which is always available beneath higher level applications. The notepad application, like other applications, runs within a window, which in this instance comprises the entire viewing screen 42. Therefore, as used herein, a "window" is the entire screen or any portion of an entire screen which is dedicated to a particular application program.

A status bar 56 may be provided at the bottom of the notepad application. The status bar 56 may be provided with a number active areas including a real time clock 58, a view button 60, a font button 62, an equations button 64, a text button 66, a graphics button 68, and a nib button 70.

One of the buttons 52 among the buttons 24 may be dedicated to "date" type functions, including a calendar or schedule function and a to-do function. This dedicated button 52 is labeled 52' in FIG. 2.

A known computing device of the same general type as that shown in FIG. 2 has a plastic case including a region below the display screen that serves as a palm rest during writing. In accordance with one aspect of the present invention, there is provided within this region a touch-sensitive input device 21, or "keyboard/mouse." The touch-sensitive input device may serve to provide an alternate method of inputting information to the computing device, in addition to stylus input. Alternatively, the touch-sensitive input device may provide the sole or primary input method, to the exclusion of stylus input.

Figure 3:
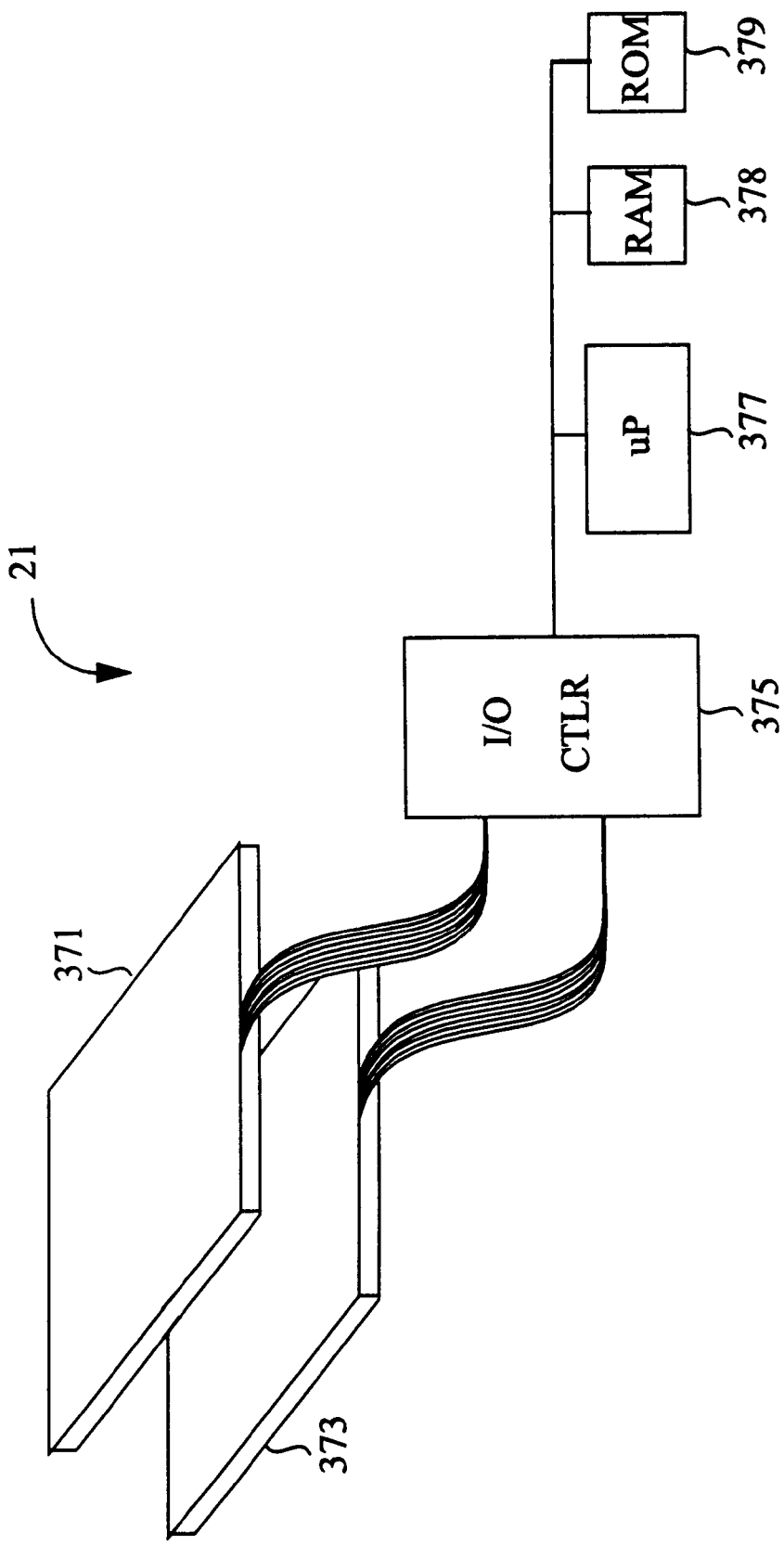
FIG. 3 is a simplified diagram of the keyboard/mouse of the touch-sensitive input device of FIG. 2.

FIG. 3 shows an exemplary hardware realization of the keyboard/mouse, indicated generally by the reference numeral 21. A touch sensor array 371 overlies a display 373. The touch sensor array may be of the type disclosed in the aforementioned Edwards patent, for example. The touch sensor array 371 and the display 373 are interface through an I/O controller 375 to a microprocessor 377. The microprocessor 377 is connected across a bus to a RAM 378 and a ROM 379. The I/O controller 375, microprocessor 377, RAM 378 and ROM 379 may be the same as or separate from respective elements 18, 12, 16 and 14 in FIG. 1.

Figure 4:
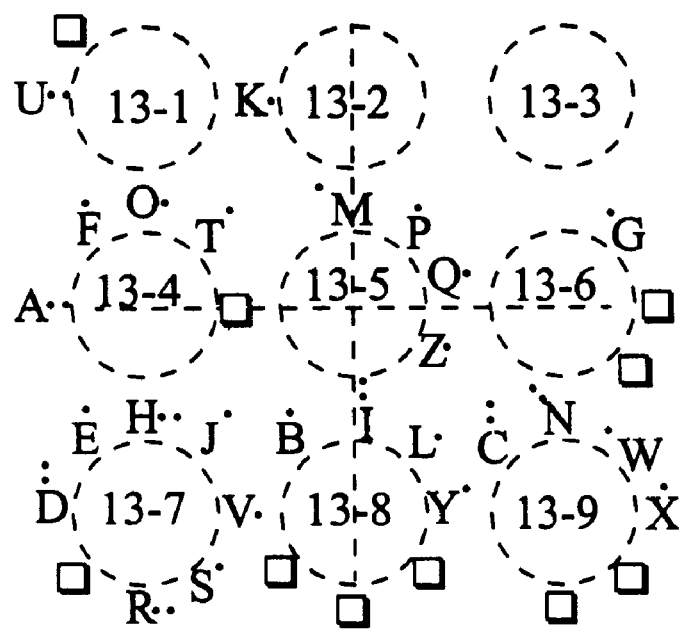
FIG. 4 is a diagram of a surface of the touch-sensitive input device of FIG. 2.

Referring to FIG. 4, in an exemplary embodiment, a number of different regions (for example, nine) are indicated on the surface of the touch-sensitive input device. The regions may be indicated by indicia applied by printing, screening, or the like, or may be indicia displayed on a display device underlying the touch-sensitive membrane. In the latter instance, of course the indicia may be variable rather than fixed during the course of using the device. If the indicia are fixed, they may be formed on a thin transparent overlay that may be removed in "expert" mode. Preferably, however, a cross-hair is presented to the user even in expert mode. The two lines of the cross-hair, one at a horizontal coordinate X and another at a vertical coordinate Y, define nine regions as follows:

TABLE 1

| Region No. | Horizontal Touch Position Relative to X | Vertical Touch Position Relative to Y |
| --- | --- | --- |
| 1 | < | < |
| 2 | = | < |
| 3 | > | < |

TABLE 1-continued

| Region No. | Horizontal Touch Position Relative to X | Vertical Touch Position Relative to Y |
| --- | --- | --- |
| 4 | < | = |
| 5 | = | = |
| 6 | > | = |
| 7 | < | > |
| 8 | = | > |
| 9 | > | > |

In beginning mode, the cross-hair may not be displayed. Instead, the regions may be indicated by the indicia displayed, printed, screened, or otherwise made visible.

Characters are input, for at least more than half of the letters of the English alphabet, by simultaneously touching more than one of the regions, for example two regions. To take a number of examples, the letter A is input, for example, by touching regions 13-4 and 13-6, the letter B is input, for example, by touching regions 13-5 and 13-8, the letter C is input, for example, by touching regions 13-3 and 13-9, etc. Other chord patterns may be used to input other characters. For example, a single touch (using the index finger or middle finger, for example) in any area may be used to designate a space. Three simultaneous touches (using the thumb, index finger and middle finger, for example) may be used to produce the succeeding character in upper case. Three simultaneous touches repeated twice in succession may be used as a cap lock signal. Other touch patterns may be used to designate different fonts or sub-fonts, for example a numerics sub-font, a punctuation sub-font, etc. Since there are 36 possible two-touch combinations, however, and only twenty six letters in the English alphabet, preferably the most common punctuation marks and control characters (period, comma, backspace, return, etc.) are included in the principal or default sub-font. If the touch-sensitive input device includes a display device, the displayed indicia may be changed when the sub-font is changed.

In the example of FIG. 4, it is assumed that each letter is input by touching one region with the thumb and another regions with the index finger or middle finger. The letter indicia appear (in beginning mode) in the region to be touched by the thumb. To avoid clutter, the region to be touched using the index finger of middle finger is indicated by dot symbols. For example, two dots appears to the right of the letter A, indicating that region 13-6, the region two to the right of region 13-4 in which the letter A appears, is the region to be simultaneously touched using the index finger or middle finger. A single dot appears above the letter B, indicating the second region as being the one above where letter B appears, etc. Of course, these particulars are illustrative only. Many other arrangements may be devised to the same end.

By displaying indicia indicating to the user the proper touch patterns, user reluctance to try a new input device may be reduced. Also, by using simple chord patterns, learning may be accelerated and hand fatigue during operation may be reduced. Input speed may also be increased. Another important advantage is that the processing needed is relatively simple.

Figure 5:
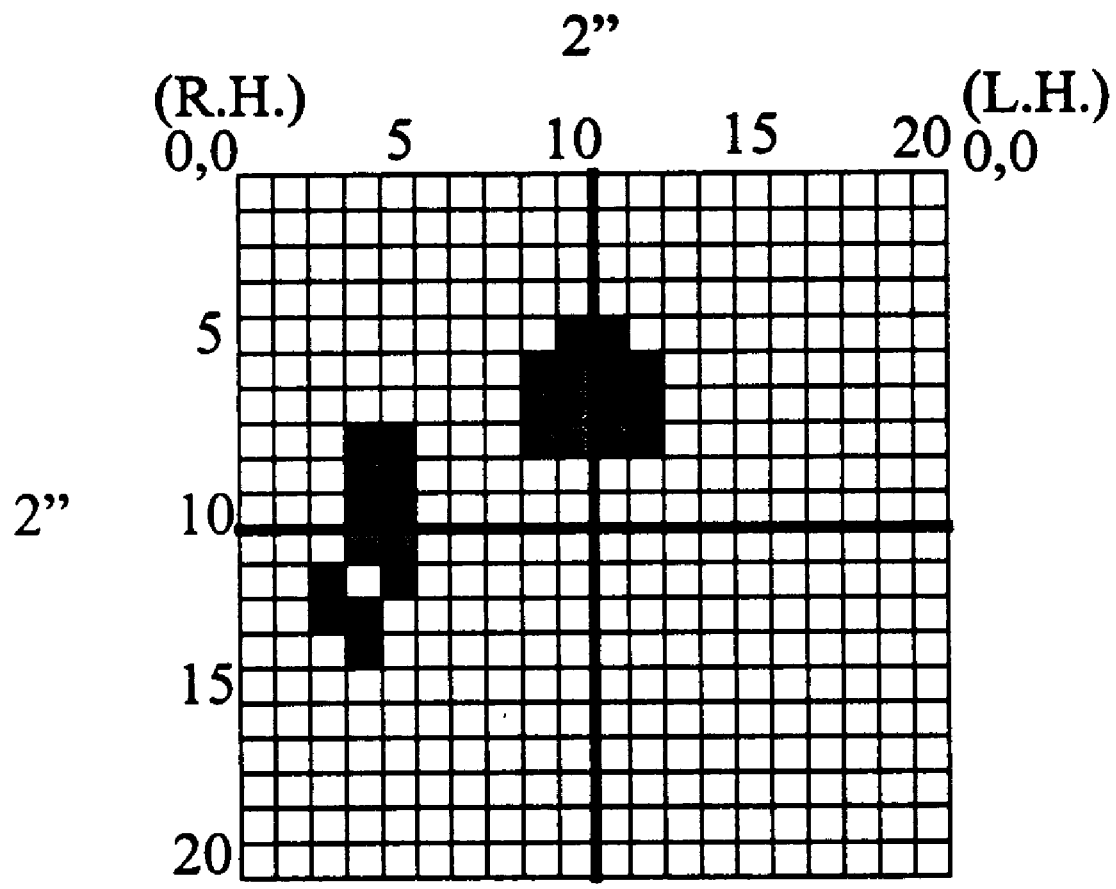
FIG. 5 is a diagram of a touch sensor array having a touch pattern superimposed thereon.

Various techniques may be used in order to sense multiple simultaneous touches. In accordance with one technique, the input device is constructed in accordance with the teachings of the aforementioned Edwards patent in order to obtain a touch image such as that shown in FIG. 5, which may be processed using suitable image processing techniques. Processing of the touch image of FIG. 5 is more particularly described in copending U.S. application Ser. No. 08/207,469 entitled TOUCH-SENSITIVE KEYBOARD MOUSE, filed Mar. 7, 1994 and incorporated herein by reference.

Further in accordance with FIG. 4, mouse operation may be combined with keyboard operation. The touch-sensitive input device may be placed in a mouse mode of operation by simply beginning to use it as a mouse in like manner as commercially-available touchpad pointing devices. Touchpad pointing devices are commercially available from such companies as Cirque, Inc. of Salt Lake City, Utah, and Alps Electronics and Touche Electronics, both of San Jose, Calif. The manner of operation of such devices is well-known. The user simply moves a finger across the surface of the touch membrane in a direction in which the user desires the cursor to move. Particulars of how the speed at which the cursor is moved is controlled, how clicking and dragging are accomplished, etc., vary from device to device. These particulars are well-known, and are not especially germane to the present invention.

One disadvantage of virtual keyboards is the lack of tactile feedback. To overcome this disadvantage, the entire touchpad, which may be approximately 5×5 cm in size, to form a mechanical key. When the touchpad is used for keying, the same sort of tactile and audible feedback may be provided as with a standard keyboard. When the mechanical key is actuated, the character to be input is determined with reference to the touch pattern of the touchpad. During operation of the touchpad as a mouse, since the touch used is lighter and has only a minimal vertical component, vertical deflection of the touchpad will normally not occur, although a thumb-activated "brake" may be provided if desired. The nature of the touchpad as a mechanical switch is preferably also used during operation as a mouse, to click, double-click, etc. The use of a mechanical switch in conjunction with a touchpad is described in U.S. Pat. No. 5,327,161 to Logan et. al., incorporated herein by reference.

Chording may also be brought into play so as to realize a mouse having 36 or more programmable buttons. For example, a click or double-click using a single finger touch may have the same effect as with a conventional, single-button mouse. A click or double click using one of the aforementioned chord patterns may be used to execute programmed commands-style changes, font changes, size changes, etc.

The touch-sensitive input device, apart from being incorporated within a computing device, may also be packaged as a separate input device, to be coupled to a computing device through a cable. The input device may function solely as a pointing device with multiple programmable "buttons," solely as a keying device, or as a combination of both as previously described.

The layout of the touch-sensitive input device of FIG. 4, because it is unlike existing input devices, is initially unfamiliar. This unfamiliarity may result in some reluctance on the part of new users to adopt such an input device. This unfamiliarity may be overcome at least in part using a layout that mimics in large part that of a standard touch-tone telephone.

Conventionally when using the telephone, words or names may be entered by pressing keys on the keypad. The layout of the keys produces a sort of hash function on the word or name being input. That is, a particular word or name will always map to the same string of digits conveyed by DTMF tones. Different words may map to the same string of digits. Recorded telephone directories are implemented by applying the same hash function to employees names and indexing them within a computer database. Preferably, the names of only one or at most a few employees will map to the same hash function. When that hash function is received from a telephone user, a recording is played to inform the user of the name or names indexed under that hash function and corresponding telephone extensions.

Figures 6, 8:
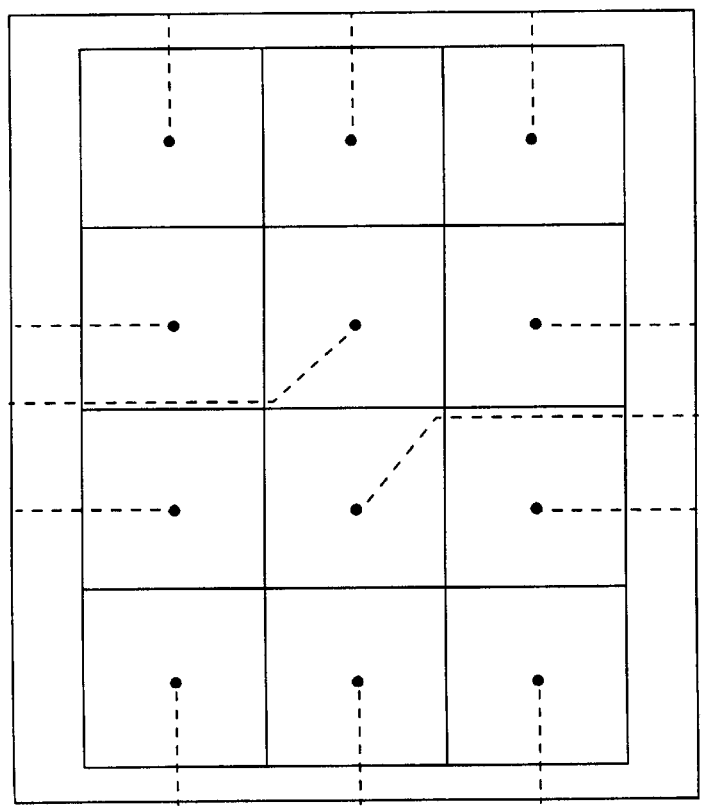
FIG. 6 is a diagram of a surface of the an input device in accordance with an alternative embodiment of the invention.
FIG. 8 is a plan schematic view of one realization of a device capable of sensing multiple simultaneous touches.

In accordance with one embodiment of the present invention, chord keying is used to enable a word or name to be unambiguously entered using a keypad having a similar layout as that of a conventional telephone keypad. Referring to FIG. 6, a keypad is provided with twelve keys-four rows of three keys each. Beginning with the upper left-hand key, the keys in the first three rows are numbered row-by-row with the digits 1 to 9. The keys will be referred to hereinafter by these numbers. The key directly underneath key number 8 is assigned the number 0.

Beginning with key number 2 and proceeding row-by-row through key number 9, each key is assigned three consecutive letters of the alphabet beginning with the letter "A." In the case of the letters "Q" and "Z," these letters are omitted from the normal sequence and are assigned instead to key number 1 in a known manner.

There remains the final row of keys. The key to the left of key number 0 is assigned "*" and the key to the right of key number 0 is assigned "#" as is conventional. The abbreviation "Oper" for operator may appear above the number 0 on key number 0.

The keypad as thus-far described has the same general layout as a conventional telephone keypad. The layout of the keypad of FIG. 6 differs from a conventional keypad in that three punctuation symbols or other characters or control codes are assigned to each of keys number 1 through number 6, number 0, the * key and the # key. The assignments as shown in FIG. 6 are illustrative only. Key number 1 and the * and # keys are additionally each assigned one further character or control code, namely return, shift, and space, respectively.

A particular letter is input by forming a chord with the key on which the letter appears and one of three adjacent keys. The pattern of which adjacent key is used to form the chord is, to the extent possible, made consistent between keys within the same column of the keypad. Hence, for keys number 1, 4 and 7, the first letter appearing on the key is input by forming a chord with the respective key immediately to the right. Taking key number 4, for example, the letter "G" is input by forming a chord with key number 4 and key number 5. The second letter appearing on the key is input by forming a chord with the respective key immediately beneath. The letter "H" is therefore input by forming a chord with key number 4 and key number 7. The third letter appearing on the key is input by forming a chord with the respective adjacent key in a lower-diagonal direction. The letter "I" is therefore input by forming a chord with key number 4 and key number 8.

For keys number 3, 6 and 9, the first letter appearing on the key is input by forming a chord with the respective key immediately to the left, the second letter appearing on the key is input by forming a chord with the respective adjacent key in a lower-diagonal direction, and the third letter appearing on the key is input by forming a chord with the respective key immediately beneath.

For keys number 2, 5 and 8, the first letter appearing on the key is input by forming a chord with the respective adjacent key in the lower-left-diagonal direction, the second letter appearing on the key is input by forming a chord with the respective adjacent key immediately beneath, and the third letter appearing on the key is input by forming a chord with the respective adjacent key in the lower-right-diagonal direction. Assuming a right-handed user, in the case of each of the keys number 1 through number 9, if the three letters on the key are produced in succession using the thumb and the middle finger to form two-key chords, the thumb begins the farthest toward the left for the first letter, rotates beneath the middle finger toward the right for the second letter, and rotates farther toward the right for the third letter. This commonality simplifies learning. Other schemes may be equally or more suitable. The foregoing scheme is therefore to be regard as illustrative only.

Typically three punctuation symbols may also be assigned to a key. A particular punctuation symbol is input by forming a chord with the key on which the punctuation symbol appears and one of three keys removed by one row. Taking again key number 4, for example, the punctuation symbol "," is input by forming a chord with key number 4 and the * key, the punctuation symbol "." is input by forming a chord with key number 4 and key number 0, and the punctuation symbol "!" is input by forming a chord with key number 4 and the # key.

The * key, key number 0, and the # key, since they have no keys below them, must be treated differently. In an illustrative embodiment, no letters are assigned to these keys (since all twenty-six letter are already assigned to keys number 1 through 9). Punctuation symbols or other characters or control characters may, however, be assigned to these keys. Keys number 1–3 participate in chording with keys *, 0 and # to input these characters. Taking key number 0, for example, the punctuation symbol "!" is input by forming a chord with key number 0 and key number 1, the punctuation symbol "@" is input by forming a chord with key number 0 and key number 2, and the punctuation symbol "$" is input by forming a chord with key number 0 and key number 3.

Figure 7:
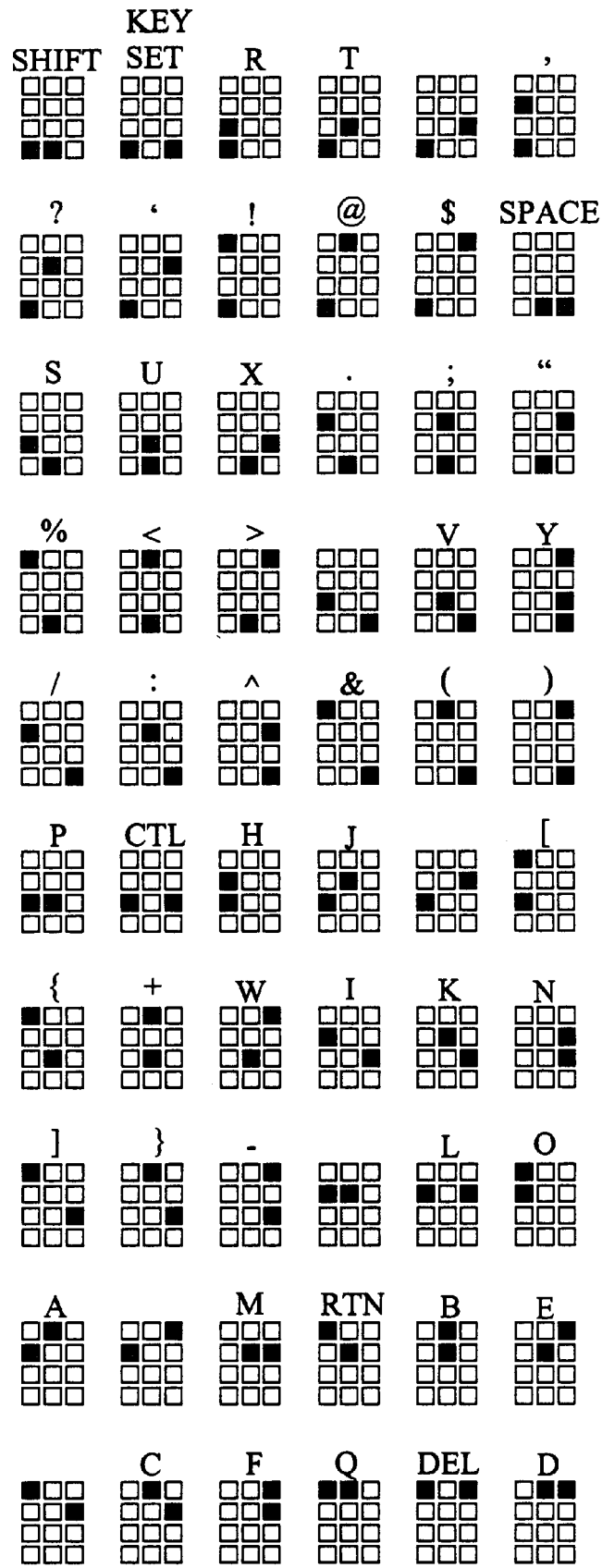
FIG. 7 is a diagram of chord assignments in accordance with the keypad layout of FIG. 6.

Of the 66 possible two-key chords possible with a layout such as that of FIG. 6, 13 chords remain. The 66 possible chords and their assignments in accordance with the foregoing illustrative scheme are shown in FIG. 7. Of the 13 remaining chords not previously mentioned, many may be used to advantage, as follows. A shift command may be input by forming a chord with the * key and key number 0. A space may be input by forming a chord with the # key and key number 0. A return of enter command may be input by forming a chord with key number 1 and key number 5.

Since a conventional computer keyboard has 104 keys, to realize the function of all of the keys requires a second "font," or character set. A fourth one of the remaining chords may be used to toggle between characters sets. This chord may be formed by the * key and # key, for example. Assuming that the keypad is realized as a touch-sensitive pad overlying an LCD display, the LCD display may display the characters for one character set or the other character set in accordance with which character set is currently selected.

Chords may also be used to provide "control," "option," and "delete" keys. Rather than "pressing" or chording the control and options keys simultaneously with chording of another key, key sequences may be built up sequentially. For example, the key combination CTL-OPT-DEL may be built up by first keying the chord for control (key number 7 and key number 9), then the chord for option (key number 4 and key number 6) and finally the chord for delete (key number 1 and key number 3).

The device may be used as a conventional telephone pad in the usual manner by simply touching the desired key with a single touch instead of a two-touch or multi-touch chord. Alternatively, special provision may be made for the space key, since it is so commonly used. As described previously, a trackpad may be provided with a mechanism that allows for vertical deflection of the entire trackpad, thus realizing in effect a single oversize key. When inputting text, this key may operate as a space key when actuated with only a single digit in whatever position. That is, if the key is pressed but no valid chord is formed, they a space may be assumed.

As with the previous embodiment, if the keypad is realized using a touchpad as a virtual keypad, the virtual keypad may be operated in a mouse mode of operation. Note, however, that the invention may be applied to mechanical keypads and even to conventional telephone keypads themselves, separate and apart from any pointing function.

Presently existing touchpad used in pointing devices are typically not capable of sensing multiple simultaneous touches. The device of the aforementioned Edwards patent may be used to provided this capability. Other alternative embodiments are also possible. Referring to FIG. 8, for example, a conventional touchpad not capable of sensing multiple simultaneous touches has painted on a surface thereof fine conductive lines each of which begins within one of the areas to be touched and ends at a periphery of the substrate, where contact is made to sensing circuitry. The conductive lines may be of conductive paint, for example. The lines may be clear in color and are made as fine as possible to minimize interference with the normal independent operation of the conventional touchpad device. When two areas are touched simultaneously, a conductive path is formed from one line to another. The sensing circuitry rapidly scans the lines in turn, checking for electrical continuity between a given line and any of the other lines. When continuity is found between a given line and another line, then a chord is determined to have been formed with the two respective areas.

Other implementations are also possible. For example, an image of the touch surface may be imaged on a CCD and the resulting image processed using image processing techniques. The image may be processed using "structured" image processing in which small portions of the image are processed in turn, checking for various conditions, rather than processing all of the image at once. The advantage of using image processing is that it provides a general technique for detecting any number of touches in any configuration, allowing the capabilities of the device to be easily increased if desired. This advantage is obtained whether using the Edwards device or a CCD. However, CCDs are more widely available at the present time.

Although pen computing has developed in part as an attempt to make interaction with a computing device more natural and intuitive, it has also developed by necessity as a result of the physical impossibility of adapting a conventional keyboard and mouse for use with a sub-notebook device. Since the foregoing touch-sensitive input device provides the function of both keyboard and mouse in a very small area, it enables a notebook-style of computer interaction to be migrated to sub-notebook computing devices. That is, the computing device of FIG. 2 or similar device, instead of being pen-driven, may be menu-driven using conventional GUI, OOUI (drag-and-drop) or other technology.

Figure 9:
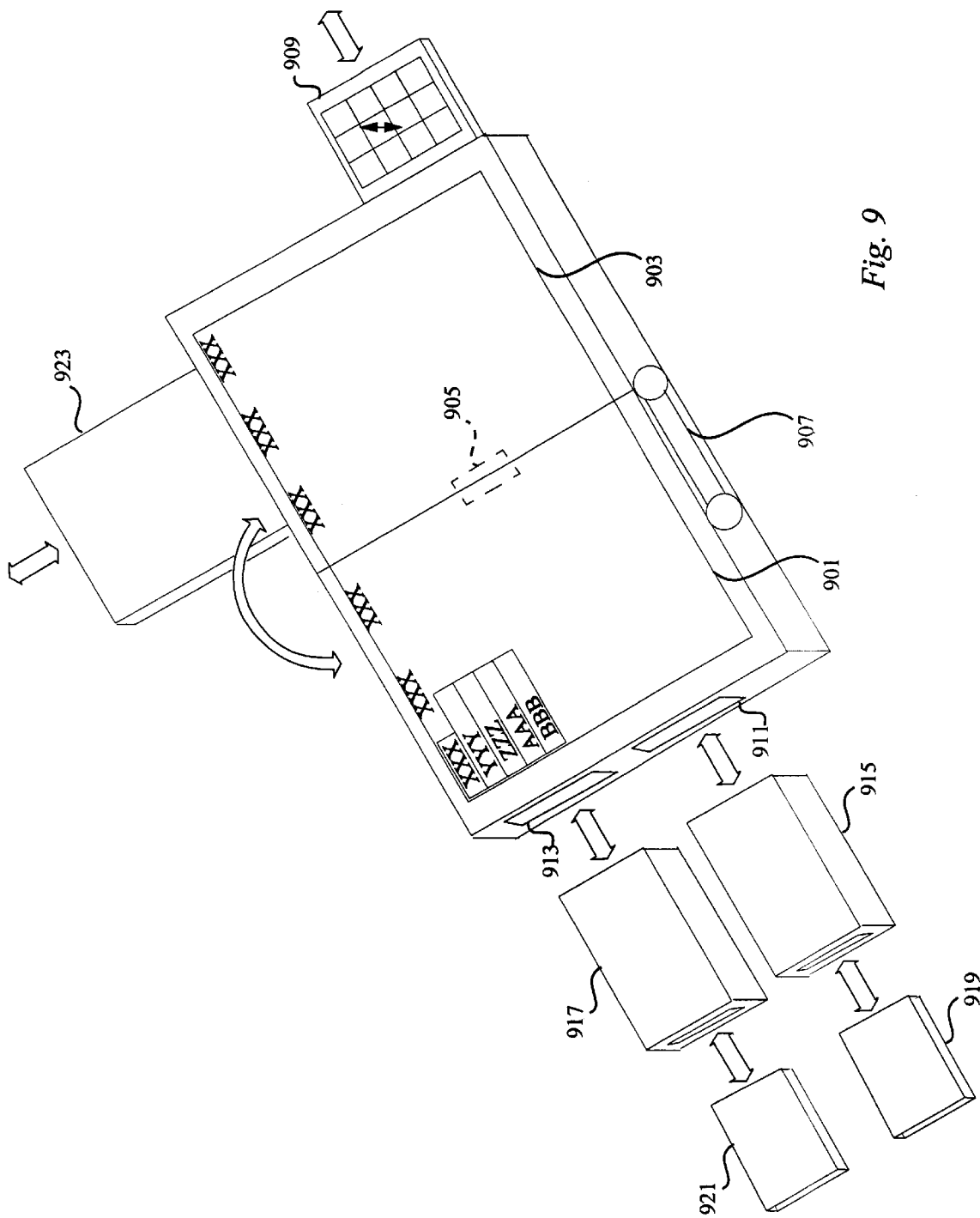
FIG. 9 is a perspective view of a computer system of in accordance with another embodiment of the invention, showing a screen display of a program having a User Interface (UI) of a type commonly used with notebook computers.
Figure 10:
FIG. 10 is a side view of the computer system of FIG. 9 in a full-open position.
Figure 11:
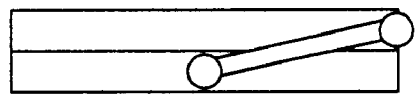
FIG. 11 is a side view of the computer system of FIG. 9 in a closed position.
Figure 12:
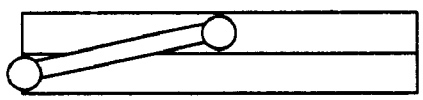
FIG. 12 is a side view of the computer system of FIG. 9 in a half-open position.

Referring to FIG. 9, a computer system is of a "clamshell configuration." Unlike present notebook computers, however, no keyboard is provided. Instead, two flat-panel displays 901, 903 are provided, arranged to mate together to form in effect a single larger display of roughly comparable dimensions as that of a notebook computer. A connector 905 communicates video information from one half of the display to the other. Arrangements for mating together multiple flat-panel displays to form a single larger display are described in U.S. Pat. Nos. 4,156,833 and 5,067,021, both of which are incorporated herein by reference. The dimensions of the computer system of FIG. 9 may be approximately 15 cm×20 cm×1.8 cm. A hinge mechanism 907 is located on either side of the computer system so as to not interfere with mating of the two halves of the display. As shown more clearly in FIG. 10, FIG. 11, and FIG. 12, respectively, the hinge mechanism allows the computer system to be fully open, fully closed, or half open, allowing it to be operated using a single flat-panel display while being held comfortably with one hand.

The virtual keyboard/mouse 909 in the computer system of FIG. 9 may be provided with a carriage and retention mechanism of a known type that allows it to be housed within the computer during transit and withdrawn during use. The retention mechanism may be such that when it is housed within the computer, pushing in on the virtual keypad/mouse releases it and allows it to be withdrawn on its carriage. Withdrawing the virtual keypad/mouse causes it to be locked in place. Following use, pressing in on the virtual keypad/mouse causes it to be released, and pushing it into the computer housing causes it to be locked within the housing. As described previously, preferably, the surface of the virtual keyboard/mouse is provided with the action of a keyboard key.

Preferably, the computer system of FIG. 9 is provided with at least one, more preferably two or more, PCMCIA or CardBus™ slots 911, 913. Such slots allows one or more PC Card removable-cartridge hard disk drives 915, 917 with associated cartridges 919, 921 to be used in the computer system. An example of such a hard drive is the SQ1100 PC Card Type III Drive sold by SyQuest Technology of Fremont, Calif.

Power for the computer system may be provided by a lithium ion battery 923 of a known type, preferably easily removable, comparable to batteries used in notebook computers.

Figure 13:
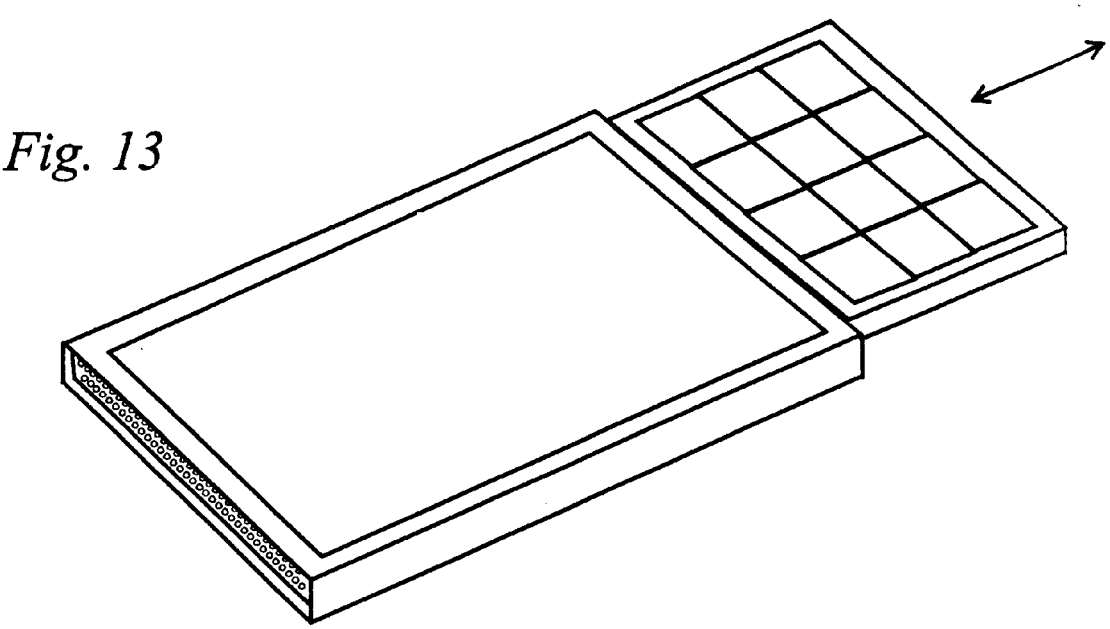
FIG. 13 is a perspective view of one realization of the computer input device used in the computer of FIG. 9.

Referring to FIG. 13, in accordance with a further embodiment of the present invention, the virtual keypad/mouse with the foregoing carriage mechanism is realized as a PC Card™, CardBus™ or PCMCIA device. Approximately one half of the space inside the card is allotted to the carriage mechanism, and the other half of the space inside the card is allotted to the device electronics. This realization allows the device to be easily added to both new and existing devices.

Figure 14:
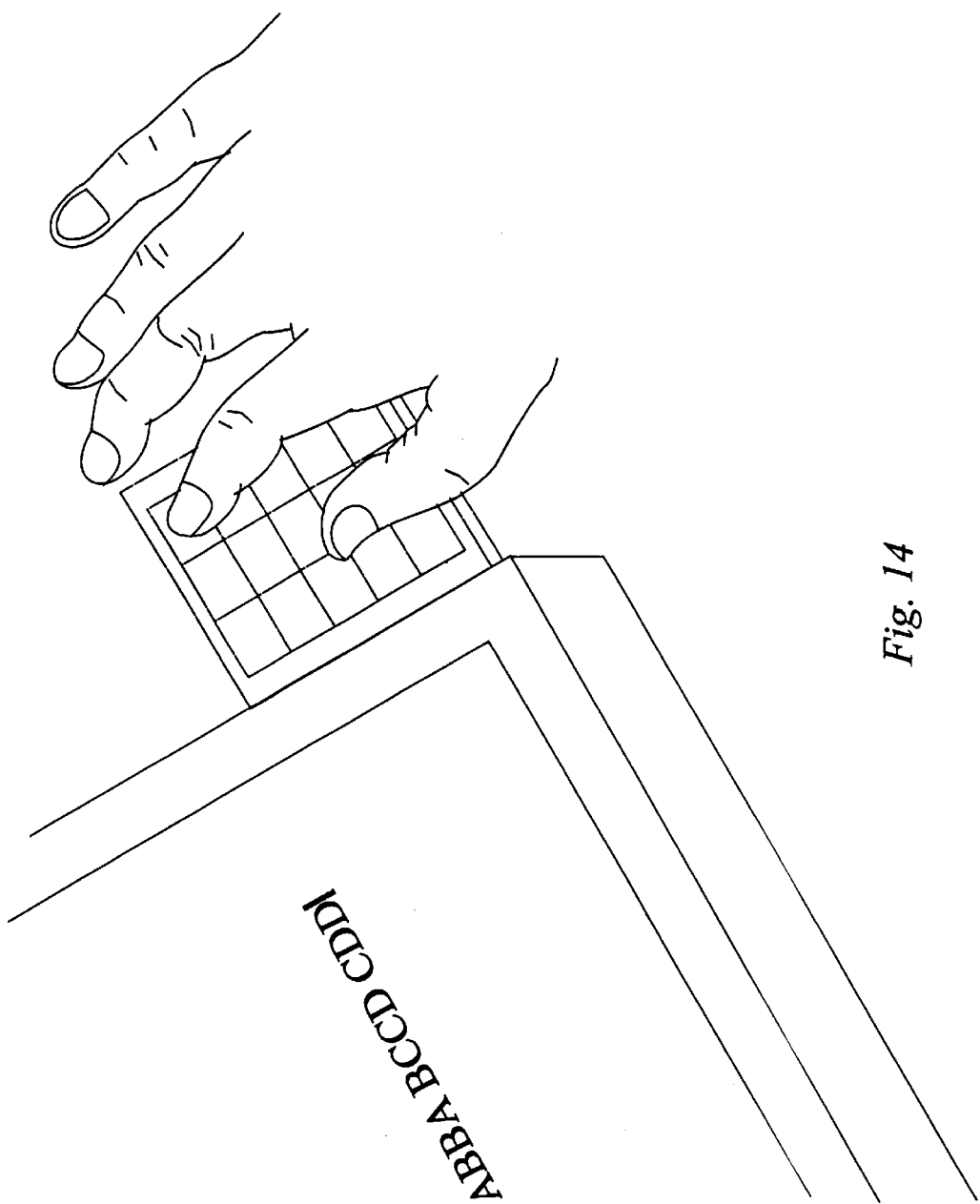
FIG. 14 is a partial perspective view of the computer system of FIG. 9, wherein text is being input.
Figure 15:
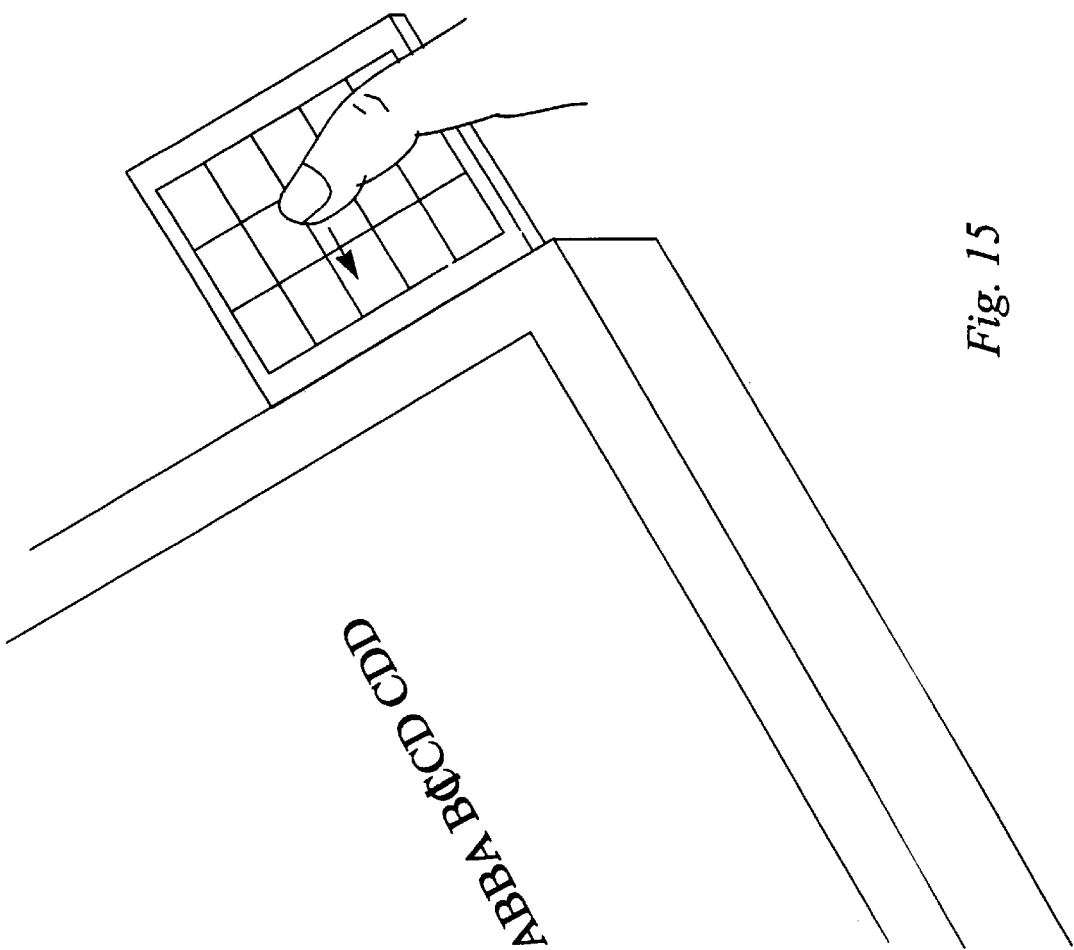
FIG. 15 is a partial perspective view of the computer system of FIG. 9, wherein a text bar is being repositioned.
Figure 16:
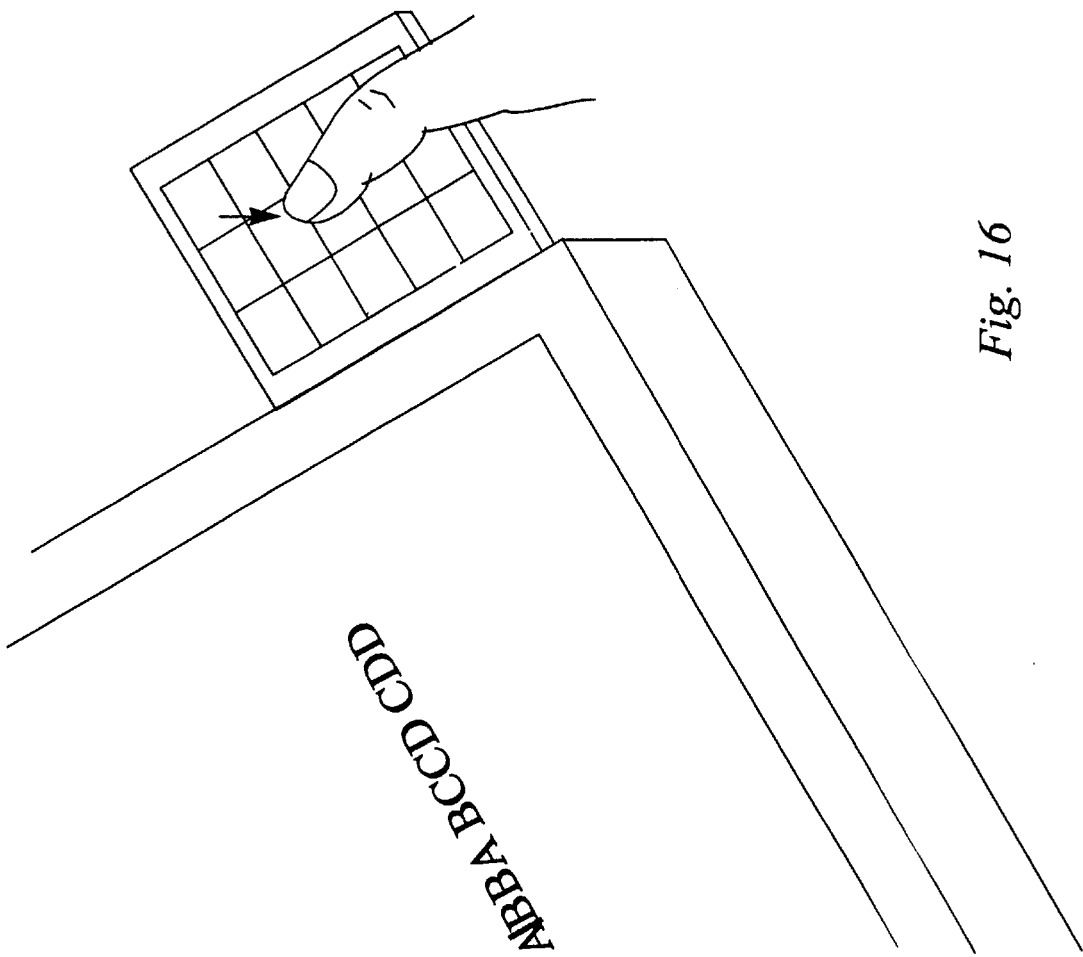
FIG. 16 is a partial perspective view of the computer system of FIG. 9, wherein the new position of the text bar is being designated by clicking.

The manner of use of the virtual keyboard/mouse within the computer system of FIG. 9 may be better appreciated with reference to FIG. 14, FIG. 15, and FIG. 16. Referring first to FIG. 14, text is being input to the computer system, with a character to be input being chorded using the thumb and one finger, possible the index finger as shown but more preferably the middle finger. Referring to FIG. 15, a text bar is being repositioned using the virtual keyboard/mouse as a mouse. Referring to FIG. 16, once the text bar has been repositioned to the desired position, a "click" is input using the key action of the virtual keyboard/mouse. Further text may now be input by chording.

Figure 17:
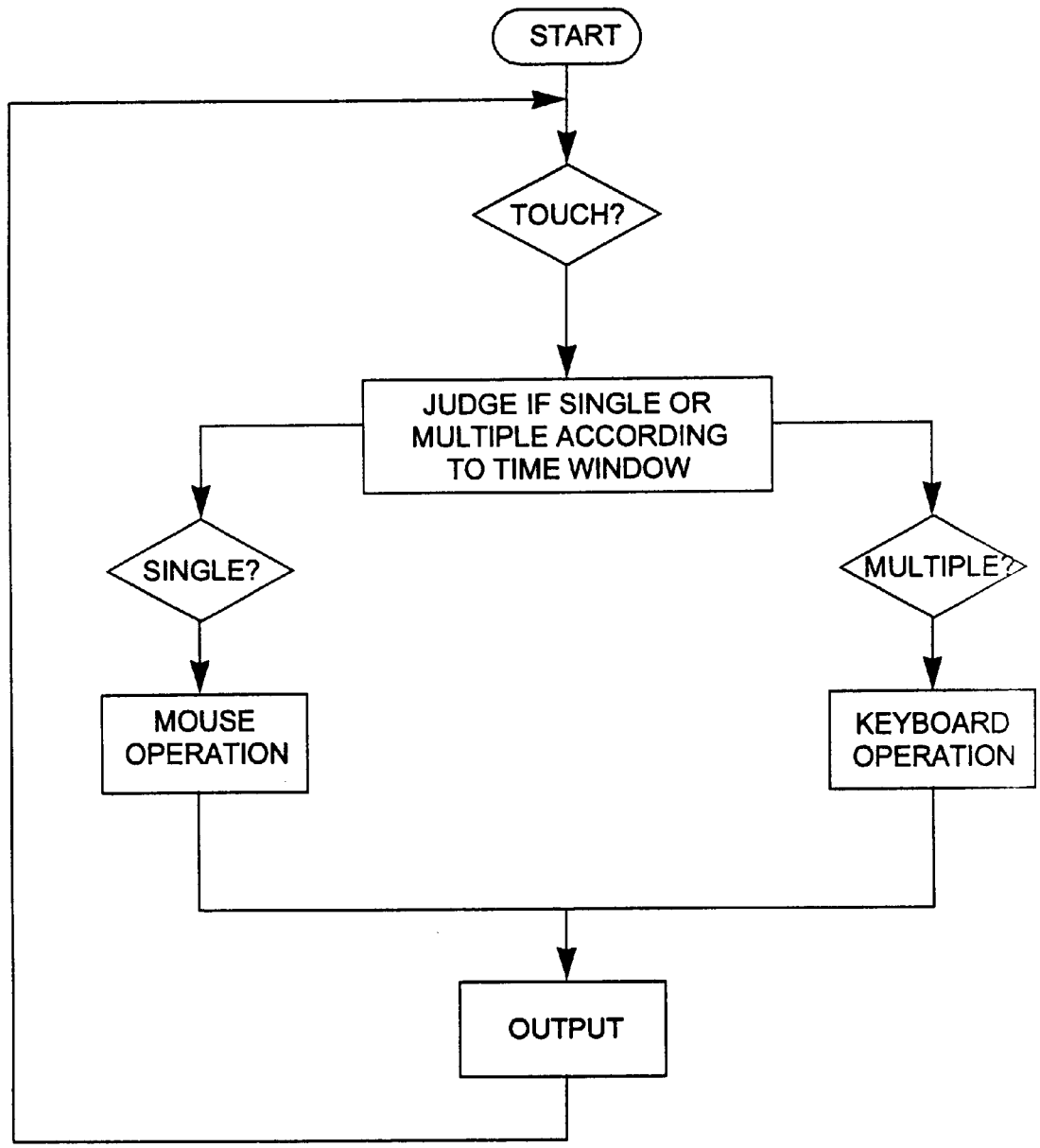
FIG. 17 is a flowchart illustrating a general processing routine executed by the touch-sensitive keyboard/mouse.

Switching between keyboard operation and mouse operation is transparent to the user. That is, code for realizing the keyboard functions and code for realizing the mouse functions is unified and is running continuously. Referring more particulary to FIG. 17, when a touch is sensed, a determination is made, in relation to a time window, whether it is a single touch or multiple touches. If it is a single touch, then mouse operation ensues. If it is multiple touches, then keyboard operation ensues. The appropriate output signals are produced, and flow returns to the beginning.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of inputting, information to an electronic device comprising the steps delineating on a single continuous surface a plurality of areas in keypad arrangement each of which is activated when pressed or touched by a digit of the user's hand each area bearing one or more images;

a user causing a contacting a portion of a first digit of the user's hand to touch a first area and a contacting a portion of a second digit of the user's hand to simultaneously touch a second area, forming a first touch pattern, so as to input a first piece of information: and thereafter, the user causing substantial relative rotation between the contacting portions of the first digit and the second digit, and causing the contacting portions to simultaneously touch respective areas, forming a second touch pattern, so as to input a second piece of information.

2. The method of claim 1, wherein said two respective areas are immediately adjacent.

3. The method of claim 1, wherein the area are arrayed as on a telephone keypad, with at least some areas bearing images of three largely sequential alphabetic characters.

4. The method of claim 3, wherein the areas are areas on mechanical keys.

5. The method of claim 3, wherein the areas are areas on a touchpad.

6. The method of claim 3, wherein the areas are arrayed in an array of four rows and three columns.

7. The method of claim 3, wherein the areas bear images including images largely as follows:

| QZ | ABC | DEF |
|---|---|---|
| 1 | 2 | 3 |
| GHI | JKL | MNO |
| 4 | 5 | 6 |
| PRS | TUV | WXY |
| 7 | 8 | 9 |
|  | Oper |  |
| * | 0 | #. |

8. The method of claim 1, wherein the method uses a touch-sensitive input device including a touch-sensitive pad to input information to a computer, wherein said plurality of area are delineated on a surface of the touch-sensitive pad; wherein one area is touched with a first digit of the hand; and wherein an adjoining region is touched with exactly one other digit such that for at least one instant of time both the first digit and the one other digit are in contact with the touch-sensitive pad; the method comprising the further steps of:

detecting a touch pattern; and inputting information to the computer in accordance with the touch pattern.

9. The method of claim 8, wherein said first digit is the thumb.

10. The method of claim 9, wherein the one other digit is the forefinger or middle finger.

11. The method of claim 8, wherein said delineating comprises delineating a plurality of areas using a plurality of intersecting lines forming at least one intersection, each of said plurality of intersecting lines dividing another of said plurality of intersecting lines into a plurality of line segments.

12. The method of claim 11, wherein detecting the touch pattern comprises detecting which areas and which line segments are touched.

13. The method of claim 12, wherein for each of a plurality of touch patterns, a line segment and an adjoining area are touched.

14. The method of claim 12, wherein for each of a plurality of touch patterns, an intersection and an adjoining area are touched.

15. The method of claim 8, wherein the information is a character.

16. The method of claim 15, wherein a plurality of characters are indicated on the touch-sensitive pad, each of the plurality of characters having a position indicating one of a area, a line and an intersection to be touched by one of the digits and a notation indicating another one of a area, a line and an intersection to be touched by another of the digits.

17. The method of claim 16, wherein the touch-sensitive input device includes a display, and the characters are displayed on the display within said plurality of areas.

18. The method of claim 8, wherein the information is a command.

19. The method of claim 8, wherein the touch-sensitive pad forms an upper surface of a mechanical key.

20. The method of claim 19, wherein the information is input only when the mechanical key is actuated.

21. The method of claim 19, further comprising:

within at least one of said plurality of areas, moving a finger across the touch-sensitive pad;

detecting lateral movement of the finger; and inputting positional information to the electronic device in accordance with the detected movement of the finger.

22. The method of claim 21, wherein the electronic device includes a display, further comprising:

displaying an icon and a cursor on the computer display; and positioning the cursor above the icon in response to the positional information.

23. An electronic input devise, comprising:

a plurality of areas delineated on a single continuous surface in keypad arrangement each of which is activated when pressed or touched by a digit of a user's hand, each area bearing one or more images;

means for detecting activation patterns in which multiple areas are simultaneously activated, including at least a first activation pattern and a second activation pattern; and means for inputting information to the electronic device in accordance with the activation patterns;

wherein the first and second activation patterns are such that substantial relative rotation occurs between contacting portions of a first digit of the user's hand and a second digit of the user's hand when the user forms the second activation pattern following the first activation, pattern using the same first and second digits.

24. The apparatus of claim 23, wherein said two areas are immediately adjacent.

25. The method of claim 1, wherein the area are arrayed as on a telephone keypad, with at least some areas bearing images of three largely sequential alphabetic characters.

26. The apparatus of claim 25, wherein the areas are areas on mechanical keys.

27. The apparatus of claim 25, wherein the areas are areas on a touchpad.

28. The apparatus of claim 25, wherein the areas are arrayed in an array of four rows and three columns.

29. The apparatus of claim 25, wherein the areas bear images including images largely as follows:

| QZ   | ABC  | DEF |
|------|------|-----|
| 1    | 2    | 3   |
| GHI  | JKL  | MNO |
| 4    | 5    | 6   |
| PRS  | TUV  | WXY |
| 7    | 8    | 9   |
|      | Oper |     |
| *    | 0    | #.  |

30. The apparatus of claim 23, comprising a touch-sensitive pad; wherein said plurality of areas are delineated on the touch-sensitive pad; wherein said means for detecting detects a touch pattern comprising multiple simultaneous touches to the surface of the touch-sensitive pad; and wherein said electronic device is a computer.

31. The apparatus of claim 30, wherein a plurality of areas are delineated using a plurality of intersection lines forming at least one intersection, each of said plurality of intersecting lines dividing another of said plurality of intersecting lines into a plurality of line segments.

32. The apparatus of claim 31, wherein the means for detecting detects which areas and which line segments are touched.

33. The apparatus of claim 32, wherein the means for detecting detects a plurality of touch patterns in which a line segment and an adjoining area are touched.

34. The apparatus of claim 32, wherein the means for detecting detects a plurality of touch patterns in which an intersection and an adjoining area are touched.

35. The apparatus of claim 23, wherein the means for inputting inputs a character.

36. The apparatus of claim 35, wherein a plurality of characters are indicated on the touch-sensitive pad, each of the plurality of characters having a position indicating one of a area, a line and an intersection to be touched by one of the digits and a notation indicating another one of a area, a line and an intersection to be touched by another of the digits.

37. The apparatus of claim 36, wherein the touch-sensitive input device includes a display, and the characters are displayed on the display within said plurality of areas.

38. The apparatus of claim 23, wherein the information is a command.

39. The apparatus of claim 23, wherein the touch-sensitive pad forms an upper surface of a mechanical key.

40. The apparatus of claim 39, wherein the means for inputting is coupled to the mechanical key and inputs the information to the computer only when the mechanical key is actuated.

41. The apparatus of claim 41, wherein said means for detecting further detects lateral movement of the finger, within at least one of said plurality of areas, and means for inputting further inputs positional information to the computer in accordance with detected movement of the finger.

42. The apparatus of claim 23, further incorporated in a handheld computing device.

43. The apparatus of claim 42, further comprising a touch-sensitive display separate from said touch-sensitive pad.

44. The apparatus of claim 42, wherein said touch-sensitive pad is realized as a portion of a main display of the computing device.

45. The apparatus of claim 42, further comprising a display that is not touch-sensitive, separate from said touch-sensitive pad.

46. The apparatus of claim 42, further comprising a first housing portion, a first display within said first housing portion, a second housing portion, and a second display within said second housing portion, and a hinge mechanism connecting said first and second housing portions.

47. The apparatus of claim 46, wherein, in one position of the hinge mechanism, an edge of the first display and an edge of the second display abut to each display part of an overall image.

48. The apparatus of claim 42, wherein the computing device is menu-driven.

49. The apparatus of claim 42, wherein the touch-sensitive input device mechanically retracts into a housing of the computing device.

50. The apparatus of claim 23, wherein the touch-sensitive input device is housed within a PC Card™, CardBus™ or PCMCIA device, and recesses into a housing of such device.

51. A method of inputting information to an electronic device including a touch-sensitive input device placed in registration with a display, comprising the steps of:
   froming on the display an image of a plurality of areas each of which is activated when touched by a digit of a user's hand, each area bearing images;
   inputting information by using multiple digits of the hand to simultaneously activate multiple respective areas.

52. The method of claim 51, further comprising inputting information by moving a digit of the hand laterally across a surface of the touch-sensitive input device.

53. An electronic input device comprising:
   a touch-sensitive input device and, placed in registration therewith;
   a display;
   means for forming on the display an image of a plurality or areas each of which is activated when touched by a digit of a user's hand, each area bearing images;
   means for detecting an activation pattern in which multiple areas are simultaneously activated; and
   means for inputting information to the electronic device in accordance with the activation pattern.

54. The apparatus of claim 53. further comprising:
   means for detecting an activation pattern which a digit of the user's hand is moved laterally across a surface, of the touch-sensitive input device; and
   means for inputting information to the electronic device in accordance with the activation pattern.

* * * * *